June 12, 1928.　　　　　　　　　　　　　　　1,672,903
D. F. PETERS
WATER GAUGE FOR MOTOR VEHICLE RADIATORS
Filed Oct. 5, 1925
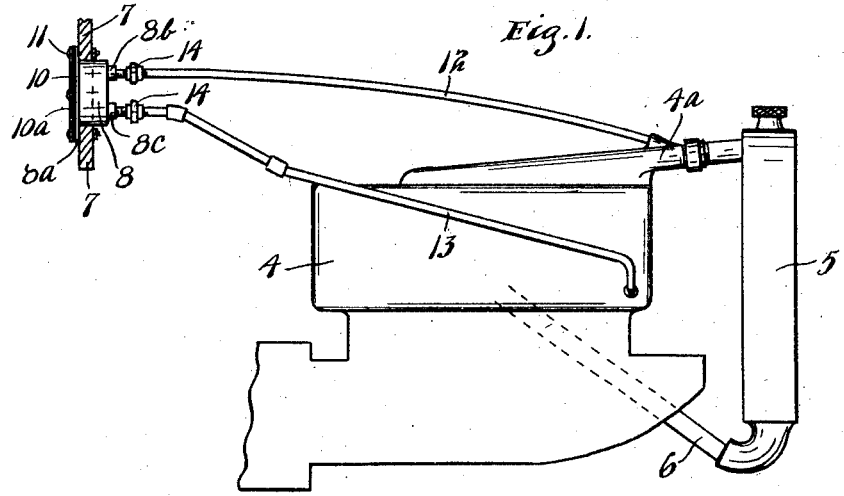
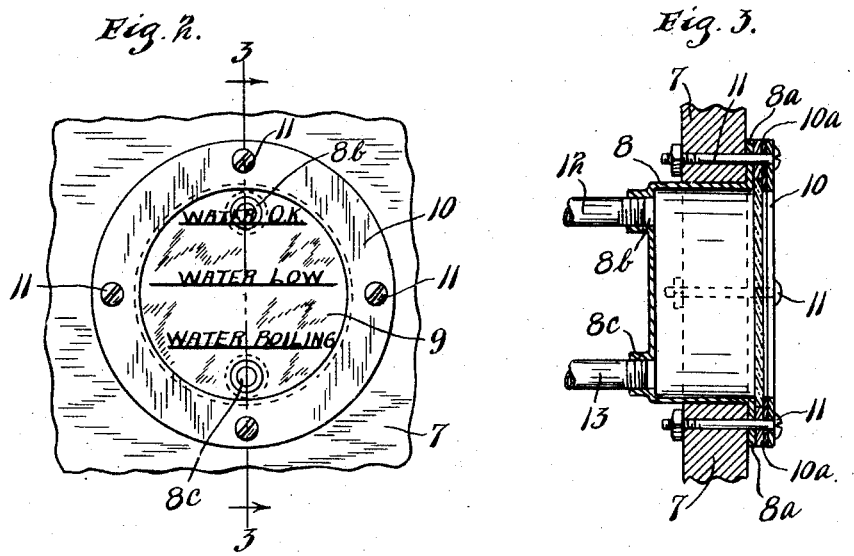
INVENTOR.
DAVID F. PETERS.
BY HIS ATTORNEYS.

Patented June 12, 1928.

1,672,903

UNITED STATES PATENT OFFICE.

DAVID F. PETERS, OF ST. PETER, MINNESOTA.

WATER GAUGE FOR MOTOR-VEHICLE RADIATORS.

Application filed October 5, 1925. Serial No. 60,497.

This invention relates to gauges for indicating the circulation and condition of the liquid in a circulating cooling system for internal combustion engines, and, while it is especially adapted for use with motor vehicles, it is not limited thereto.

The invention has for its main object to provide an extremely simple but highly efficient gauge disposed at or slightly above the level of the liquid in the circulating cooling system of an internal combustion engine and inter-connected with the circulating system in such a way that an induced current will be set up through an indicating chamber by the siphon action of the main circulating system.

A further object of the invention is to provide a device especially adapted to be mounted on the dash or instrument board of the motor vehicle, conveniently located for the driver's observation.

It is a more specific object to provide a housing having a transparent side or face conveniently located for observation and connected to the top and bottom portions of the water jacket of the engine by means of a pair of conduits.

The foregoing and other objects of the invention will be apparent from the following description made in connection with the accompanying drawings, wherein like characters refer to similar parts throughout the several views, and in which Fig. 1 is a somewhat diagrammatical side elevation of the preferred form of the invention installed on a standard engine of a motor vehicle;

Fig. 2 is a front elevation of the indicating chamber; and

Fig. 3 is a vertical cross section taken on the line 3—3 of Fig. 2.

In the drawings, my radiator water gauge is illustrated as applied to the engine and dash board of a motor vehicle. The water jacket 4 of the engine is provided with the usual outlet $4^a$ communicating with the upper end of the radiator 5. The lower end of radiator 5 communicates with the bottom of water jacket 4 through the upwardly inclined conduit 6.

On the dash or instrument board 7, I mount an indicating chamber shown in the form of a cylindrical casing 8 having the outer annular flange $8^a$ disposed flush against the dash board 7. A transparent crystal 9 is clamped against the outer side of flange $8^a$ forming an air tight joint therewith. The rear of casing 8 is provided with a lower intake port $8^c$ and an upper outlet port $8^b$. It will be noticed that the intake port $8^c$ is at a slightly higher level than the discharge end of the outlet $4^a$ from the water jacket.

I connect the lower portion of the water jacket with intake port $8^c$ by means of a conduit 13 of relatively small diameter and connect the outlet port $8^b$ with the outlet passage $4^a$ of the water jacket by means of a second conduit 12. The connection between conduit 12 and the outlet passage $4^a$ is made at an acute angle to the longitudinal center of said passage whereby the normal circulation of water from the water jacket to the radiator will cause a suction through conduit 12.

Conduits 12 and 13 are removably secured at their rearward ends to ports $8^b$ and $8^c$ by suitable unions 14.

The transparent plate or crystal 9 constituting the face of the indicating chamber is provided with several, preferably three horizontally disposed reading lines marked respectively from top to bottom "Water O. K.", "Water low" and "Water boiling".

The operation of the above described device may be briefly summarized as follows:

When the motor is running and water is circulating freely through the radiator of the water jacket, the suction or thermo siphon action will cause a small column of water to stand in the conduit 13 and in the reading chamber 8 substantially filling the chamber. In a thermo-siphon system the suction through conduit 12 is sufficient to hold the water in the reading chamber adjacent the reading "Water O. K.", while in a pump system water will be pumped through the reading chamber as long as the supply of water in the radiator is properly maintained and when the supply of water is low in the radiator little or no water will be pumped into the reading chamber and the driver will be warned. It is, of course, recognized that the temperature of the motor being approximately proportional to its speed the level in the gauge fluctuates with this factor, as well as with the level in the radiator. However, the degree of inaccuracy caused by these factors is not sufficient to vitiate the indications of the gauge.

Assuming that the radiator is filled to the high water line, the water will, of course, stand in conduit 13 when the motor is not running at the same level as the high water line in the radiator. When the motor is run and if the circulation is not obstructed, there will be sufficient suction through conduit 12, due to the disposition of this conduit relatively to the outlet 4ª of the water jacket to induce a small auxiliary circulation through the reading chamber. If the radiator 5 is in poor condition and the cooling circulation is restricted, the passage of water through outlet 4ª will not be great enough to produce sufficient suction on conduit 12 to set up the auxiliary circulation. However, a slight suction will cause the water in conduit 13 to rise into the reading chamber 8 and be held below the reading "Water O. K.", and usually adjacent the reading "Water boiling".

Assuming that the radiator 5, the water jacket and conduit 6 are in good condition, if the motor has been run for some time, there will be a loss of water in the radiator due to evaporation. This will cause the water in the conduit 13 to normally stand at a lower level when the motor is not running than when the radiator is filled. The suction through conduits 12 will be decreased and the water will be held at a lower level in the reading chamber.

Thus it will be seen that the driver may observe the reading on the crystal 9 from time to time as he is driving and may be informed when the water in the radiator is low. Likewise, if the radiator is restricted and if the outlet 4ª or conduit 6 is restricted the gauge will inform him of the same.

From the above description it will be seen that applicant has invented an extremely simple but highly efficient water gauge for motor vehicle radiators capable of being readily installed as an attachment in standard motor vehicles.

Applicant has found that the dashboards of motor vehicles, while varying somewhat in height, are at substantially the correct height for producing the readings desired. In other words, by using approximately 3/8 inch conduits, and mounting the water chamber on the dash, an auxiliary induced current will be set up which will be varied as observed in the indicating chamber when slight variation occurs in the main circulating system. The auxiliary circulation will be stopped when the water has fallen a slight amount although the siphon action of the radiator will be sufficient, as has been stated, to hold the water level in the gauge at the various readings, according to the condition of the water in the main system.

The device has been put to extensive actual usage and has been carefully tested out, having proven to be highly successful for all the purposes intended.

The device may be utilized with equally successful results in motor cars having the dashboard at substantially the same level as the water level in the radiator and at times there have been a few motor cars on the market having the dashboard in this relative position. Where this is the case, the readings will be raised slightly in the face plate 9 and the water will, of course, stand in the gauge up to a certain level when the motor is idle. The application of the device to this use is, of course, within the scope of the invention as described.

It will, of course, be understood that various other changes may be made in the form, details, proportions and arrangement of the parts without departing from the scope of the invention.

What is claimed is:

1. In combination with the radiator, water jacket and radiator water return of an internal combustion engine of an automobile, an indicating chamber mounted rearwardly of the engine and slightly above the level of said radiator return, a conduit connecting the upper portion of said chamber with said radiator return, said connection with said radiator return being so inclined relatively thereto that the return flow will produce suction in the connection, and a conduit connecting the lower portion of the indicating chamber with the lower portion of said water jacket.

2. A gauge of the class described for application to an internal combustion engine having a radiator, water jacket and a return conduit communicating with the radiator and comprising a relatively small indicating chamber having a transparent face and disposed slightly above the level of said return conduit, a conduit of small diameter relative to the diameter of said return conduit communicating at one end with the upper portion of said indicating chamber and communicating at its other end with said return conduit, the connection between said smaller conduit and said return conduit defining an acute angle such that the return flow will produce suction in the connection and a conduit connecting the lower portion of the water jacket with the lower portion of said indicating chamber.

In testimony whereof I affix my signature.

DAVID F. PETERS.